US012812683B2

(12) United States Patent
Xia et al.

(10) Patent No.: US 12,812,683 B2
(45) Date of Patent: Nov. 24, 2026

(54) RANDOM ACCESS METHOD, ACCESS CONTROL METHOD, AND TERMINAL, ACCESS POINT AND STORAGE MEDIUM

(71) Applicant: ZTE CORPORATION, Shenzhen (CN)

(72) Inventors: Shuqiang Xia, Shenzhen (CN); Peng Hao, Shenzhen (CN); Yijian Chen, Shenzhen (CN); Feng Xie, Shenzhen (CN); Bo Dai, Shenzhen (CN); Guanghui Yu, Shenzhen (CN); Liujun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 253 days.

(21) Appl. No.: 18/270,825

(22) PCT Filed: Oct. 13, 2021

(86) PCT No.: PCT/CN2021/123418
§ 371 (c)(1),
(2) Date: Jul. 3, 2023

(87) PCT Pub. No.: WO2022/148081
PCT Pub. Date: Jul. 14, 2022

(65) Prior Publication Data

US 2024/0298352 A1 Sep. 5, 2024

(30) Foreign Application Priority Data

Jan. 5, 2021 (CN) ......................... 202110009097.2

(51) Int. Cl.
*H04W 74/0833* (2024.01)
*H04W 72/23* (2023.01)

(52) U.S. Cl.
CPC ....... *H04W 74/0833* (2013.01); *H04W 72/23* (2023.01)

(58) Field of Classification Search
CPC ........... H04W 74/0833; H04W 74/002; H04W 72/23; H04W 56/001; Y02D 30/70
See application file for complete search history.

(56) References Cited

U.S. PATENT DOCUMENTS

2013/0265972 A1 10/2013 Shirani-Mehr et al.
2019/0104551 A1 4/2019 Deenoo et al.
(Continued)

FOREIGN PATENT DOCUMENTS

CN 108736920 A 11/2018
CN 110535602 A 12/2019
CN 112822788 A 5/2021

OTHER PUBLICATIONS

European Extended Search Report dated Nov. 6, 2024 in corresponding European Application No. 21917123.8, 8 pages.
(Continued)

*Primary Examiner* — Sulaiman Nooristany
(74) *Attorney, Agent, or Firm* — MH2 Technology Law Group LLP

(57) ABSTRACT

A random access method includes: transmitting a physical random access channel (PRACH); receiving a timing pilot signal for responding to the PRACH and detecting a random access response (RAR) message and a physical downlink control channel (PDCCH) for indicating the RAR message, where timings of the RAR message and the PDCCH are determined based on a timing of the timing pilot signal; and transmitting a third message according to the timing pilot signal, the RAR message and the PDCCH, where the third message is used for requesting access to a network.

17 Claims, 5 Drawing Sheets

(56) References Cited

U.S. PATENT DOCUMENTS

| | | | |
|---|---|---|---|
| 2019/0306817 | A1 | 10/2019 | Abedini et al. |
| 2020/0305038 | A1 | 9/2020 | Tooher et al. |
| 2022/0053574 | A1* | 2/2022 | Taherzadeh Boroujeni ................ H04L 5/0091 |
| 2022/0123888 | A1 | 4/2022 | Yuan et al. |
| 2022/0191940 | A1* | 6/2022 | MolavianJazi ...... H04B 17/328 |
| 2022/0201770 | A1* | 6/2022 | Xu ..................... H04B 7/18504 |
| 2023/0337287 | A1* | 10/2023 | Yang ................. H04W 56/0015 |

OTHER PUBLICATIONS

International Search Reported dated Dec. 23, 2021 in corresponding International Application No. PCT/CN2021/123418, translated, 13 pages.

ZTE, R2-093150, "Simplified MAC RAR for dedicated preamble," 3GPP TSG-RAN WG2 Meeting #66, San Francisco, USA, Mar. 4-8, 2009, 4 pages.

Ericsson, R2-1708193, "MAC RAR PDU Design," 3GPP TSG-RAN WG2 #99, Berlin, Germany, Aug. 21-25, 2017, 4 pages.

Nokia et al., R1-1704943, "NR Random Access Procedure," 3GPP TSG-RAN WG1 #88bis, Spokane, USA, Apr. 3-7, 2017, 9 pages.

Chinese First Office Action dated Jun. 10, 2026 in corresponding Chinese Application No. 202110009097.2, translated, 16 pages.

Ericsson, "Corrections for 2-step Random Access Type," 3GPP TSG-RAN WG2 Meeting #109bis-e, Apr. 20-30, 2020, 818 pages.

Chinese Decision of Rejection dated Sep. 23, 2026 in corresponding Chinese Application No. 202110009097.2, translated, 14 pages.

3GPP "5G; NR; Physical channels and modulation," 3GPP TS 38.211 version 16.2.0 Release 16, 2020, 136 pages.

3GPP "5G; NR; Physical layer procedures for control," 3GPP TS 38.213 version 16.2.0 Release 16, 2020, 180 pages.

3GPP "5G; NR; Physical layer procedures for control," 3GPP TS 38.213 version 16.3.0 Release 16, 2020, 181 pages.

* cited by examiner

RANDOM ACCESS METHOD, ACCESS CONTROL METHOD, AND TERMINAL, ACCESS POINT AND STORAGE MEDIUM

CROSS-REFERENCE TO RELATED APPLICATION

This application is a national phase entry under 35 USC 371 of International Patent Application No. PCT/CN2021/123418 filed on Oct. 13, 2021, which is incorporated herein by reference in its entirety.

TECHNICAL FIELD

The present application relates to the field of wireless communication networks, and for example, to a random access method, an access control method, a terminal, an access point and a storage medium.

BACKGROUND

With the deployment and application of various low-power access points such as micro cells, small cells, femtocells and relay nodes, cellular networks are showing an increasingly heterogeneous and dense trend. For the purpose of saving energy or reducing interference, some access points (APs) are in a closed state when services are sparse, and a terminal may select one from APs providing coverage to access the network service. However, the APs providing coverage are independent of APs providing capacity, and the APs providing coverage do not necessarily provide an optimal service for the terminal. The terminal only selects an AP to be accessed from APs in an operating state. In this case, it cannot ensure that the selected AP has an optimal quality of service, which will not only affect the communication efficiency of the terminal, but also easily cause waste of power or spectrum resources.

SUMMARY

The present application provides a random access method, an access control method, a terminal, an access point and a storage medium.

Embodiments of the present application provide a random access method applied to a terminal. The method includes:

transmitting a physical random access channel (PRACH);

receiving a timing pilot signal for responding to the PRACH and detecting a random access response (RAR) message and a physical downlink control channel (PDCCH) for indicating the RAR message, timings of the RAR message and the PDCCH being determined based on timing of a timing pilot signal; and transmitting a third message according to the timing pilot signal, the RAR message and the PDCCH, the third message being used for requesting access to a network.

The embodiments of the present application further provide an access control method applied to an access point. The method includes:

transmitting, in a case of receiving a PRACH, a timing pilot signal for responding to the PRACH, a RAR message and a PDCCH for indicating the RAR message, timings of the RAR message and the PDCCH being determined based on a timing of the timing pilot signal; and transmitting, in a case of detecting a third message, a fourth message, the fourth message being used for informing a terminal that the terminal has accessed to a network.

The embodiments of the present application further provide a terminal. The terminal includes a memory, a processor, and a computer program stored on the memory and executable on the processor. The processor, when executing the program, implements the above random access method.

The embodiments of the present application further provide an access point. The access point includes: a memory, a processor, and a computer program stored on the memory and executable on the processor. The processor, when executing the program, implements the above access control method.

The embodiments of the present application further provide a non-transitory computer-readable storage medium. The computer-readable storage medium has stored a computer program. The program, when executed by a processor, implements the above random access method or the above access control method.

DETAILED DESCRIPTION

Figure 1:
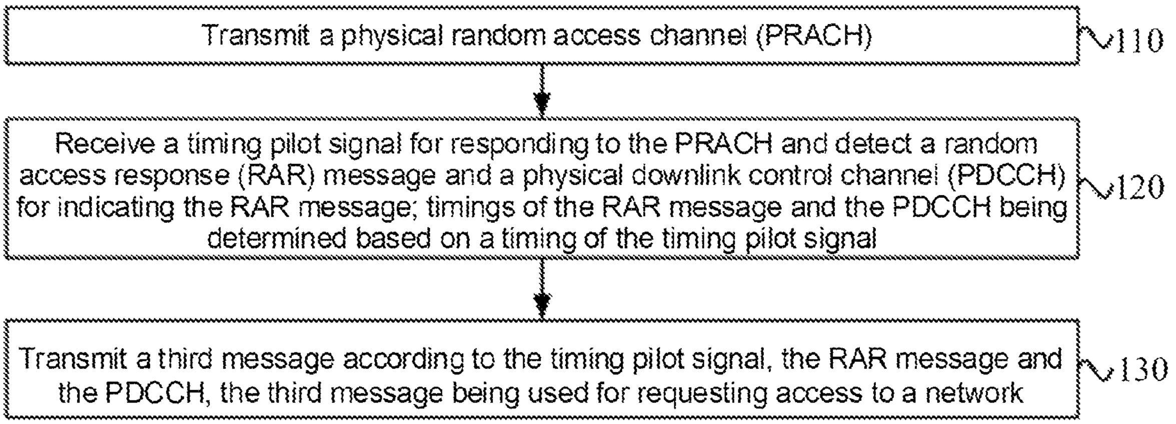
FIG. 1 is a flow chart of a random access method, in accordance with an embodiment.

The present application will be described below with reference to the drawings and embodiments. The specific embodiments described herein are merely used for explaining the present application. For ease of description, only parts relevant to the present application are shown in the drawings.

In embodiments of the present application, a random access method is provided. A terminal receives a timing pilot signal, so as to select an access point (AP) to be accessed from APs capable of responding to a physical random access channel (PRACH), which extends selectable access points and enables the terminal to obtain a high quality of service.

FIG. 1 is a flow chart of a random access method, in accordance with an embodiment. As shown in FIG. 1, the method provided by this embodiment includes steps 110 to 130.

In step 110, a physical random access channel (PRACH) is transmitted.

In step 120, a timing pilot signal for responding to the PRACH is received, and a random access response (RAR) message and a physical downlink control channel (PDCCH)

for indicating the RAR message are detected, timings of the RAR message and the PDCCH being determined based on a timing of the timing pilot signal.

Determining a timing of the RAR message based on the timing of the timing pilot signal, includes: the timing of the RAR message being same as the timing of the timing pilot signal; or determining the timing of the RAR message based on the timing of the timing pilot signal, e.g., adjusting the timing of the RAR message based on the timing of the timing pilot signal according to a pilot associated with the RAR message. Determining a timing of the PDCCH based on the timing of the timing pilot signal is similar to determining the timing of the RAR message based on the timing of the timing pilot signal. For example, the timing pilot signal, the RAR message and the PDCCH have same timing information.

In step 130, a third message is transmitted according to the timing pilot signal, the RAR message and the PDCCH, the third message being used for requesting access to a network.

In this embodiment, the terminal is, for example, a user equipment (UE). The UE transmits the PRACH, and there may be one or more APs on a network side receiving the PRACH transmitted by the UE. After receiving the PRACH, each AP can transmit a timing pilot signal responding to the PRACH to the UE. A timing of the timing pilot signal may be same as or different from a timing of a synchronization signal and physical broadcast channel (PBCH) block (SSB) or a SIB-1 of a system information block (SIB). After transmitting the timing pilot signal, each AP further transmits a RAR message and a PDCCH indicating the RAR message, and timings of the RAR message and the PDCCH are related to the timing of the timing pilot signal transmitted. On this basis, each AP that transmits a relevant timing pilot signal, RAR message and PDCCH may be used as a candidate AP for UE to access a network. The candidate AP is not limited to an AP in an operating state, so that the UE has more choices for accessing the network, and the UE may obtain the optimal quality of service.

Figure 2:
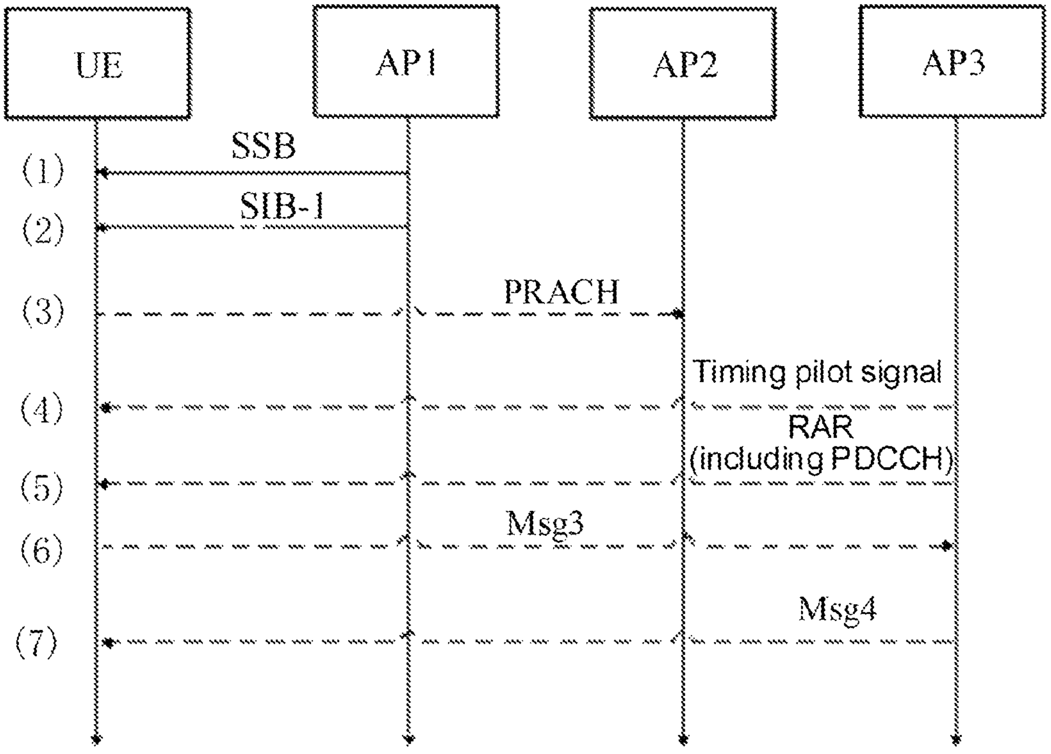
FIG. 2 is a schematic diagram of a random access procedure, in accordance with an embodiment.

FIG. 2 is a schematic diagram of a random access procedure, in accordance with an embodiment. In this embodiment, a set of APs that transmit the SSB or SIB-1 is denoted as AP1, a set of APs that receive the PRACH signal is denoted as AP2, and a set of APs that can provide services for the UE or allow the UE to access the network is denoted as AP3. As shown in FIG. 2, for a UE that wants to access a wireless network, the UE transmits a PRACH signal according to an indication of the SIB-1 of the AP1. The PRACH signal may be received by one or more APs. The APs that receive the PRACH signal constitute the AP2, and the AP2 includes APs that transmit the SSB or SIB-1, and may further include APs that do not transmit the SSB or SIB-1, and even may include APs that are in a dormant state for the purpose of energy saving and interference reduction. The AP3 may be determined from the AP2 according to strength of the received PRACH signal, timing information, AP load and/or available resources. The AP3 may be determined by the APs in the AP2 by negotiating with each other, or determined by a central control node according to information reported by the AP2. After transmitting the timing pilot signal, the AP3 further transmits a RAR message and a PDCCH indicating the RAR message, and the RAR message and PDCCH follow the timing of the timing pilot signal.

The timing pilot signal corresponding to the PRACH and transmitted by the AP3 may be used not only for the UE to determine the timing information in a transmission process, but also for the UE to perform channel state measurement and channel estimation, etc. Since the SSB or SIB-1 is generally used for providing services for a UE within a large coverage area, a distance between the AP transmitting the SSB or SIB-1 and the UE is relatively long. The timing pilot signal provides services for the UE transmitting the PRACH, and the AP transmitting the timing pilot signal is determined according to the strength of the received PRACH signal, the timing information, the AP load and/or available resources and is generally an AP with a relatively short distance from the UE transmitting the PRACH. The timing of the timing pilot signal may have a large difference from a timing of the UE, and may also have a large difference from a timing of the SSB or SIB-1.

The UE receives the timing pilot signal, and further detects the PDCCH and the RAR message in a case where the timing pilot signal is received successfully, and transmits Msg3 on the basis of successful detection of both the PDCCH and the RAR message. The Msg3 includes a UE identifier, etc., so as to make a request to the AP3 access to a network. On the basis of successfully detecting Msg3, the AP3 transmits Msg4 to inform the UE that the UE has accessed to a network successfully.

In an embodiment, the timing pilot signal satisfies at least one of: that an index of the PRACH satisfies a one-to-one relationship with the timing pilot signal; or that a random access-radio network temporary identity (RA-RNTI) of the PRACH satisfies a one-to-one relationship with the timing pilot signal.

In this embodiment, there is a one-to-one correspondence between the PRACH transmitted by the UE and the timing pilot signal, that is, the AP can determine the only timing pilot signal responding to the PRACH according to the index and/or RA-RNTI of the received PRACH.

There may be multiple timing pilot signals available on the network side, and different timing pilot signals may use different pilot sequences or use different resources. The network side determines a timing pilot signal to be transmitted to the UE according to the received PRACH, and may transmit the timing pilot signal within a preset time window. In some embodiments, a corresponding relationship between the index and/or RA-RNTI of the PRACH and the timing pilot signal is preset, for example, the network side indicates the corresponding relationship between the index and/or RA-RNTI of the PRACH and the timing pilot signal to the UE in system information such as SIB-1. On this basis, the timing pilot signal further corresponds to a PDCCH indicating a RAR message. At a receiving terminal, the UE detects the timing pilot signal within a predefined time window, and detects the RAR message and the PDCCH indicating the RAR message according to the timing of the timing pilot signal after successfully detecting the timing pilot signal.

In an embodiment, the third message includes an index of an optimal timing pilot signal (hereinafter referred to as optimal pilot signal index or optimal pilot index) obtained by measurement; and the timing pilot signal satisfies at least one of: that the index of the PRACH satisfies a one-to-many relationship with the timing pilot signal; or that the RA-RNTI of the PRACH satisfies a one-to-many relationship with the timing pilot signal.

In this embodiment, there is a one-to-many corresponding relationship between the PRACH transmitted by the UE and the timing pilot signal, that is, the AP can transmit multiple timing pilot signals for responding to the PRACH according to the index and/or RA-RNTI of the received PRACH. In some embodiments, a corresponding relationship between the index and/or RA-RNTI of the PRACH and the timing pilot signal is preset, for example, the network side indicates the corresponding relationship between the index and/or RA-RNTI of the PRACH and the timing pilot signal to the UE in system information such as SIB-1. For example, a 1–N (N is greater than 1) corresponding relationship is satisfied between the index and/or RA-RNTI of the PRACH and the timing pilot signal. After receiving the PRACH transmitted by the UE, the network side selects M timing pilot signals and transmits them within a preset time window according to the corresponding relationship, where Nis greater than or equal to M and M is greater than 1 ($N \geq M > 1$). In some embodiments, precoding used by each timing pilot signal may be different, an AP used for transmitting each timing pilot signal may be different, and a timing of each timing pilot signal may be different.

At the receiving terminal, the UE detects the M timing pilot signals within the preset time window, and detects the RAR message and the PDCCH indicating the RAR message based on the optimal pilot signal index. If the detection of the M timing pilot signals is successful, the UE further reports the optimal pilot index detected in the Msg3 according to indication information in the RAR message. If the detection of the M timing pilot signals fails (none of the N timing pilot signals is detected), it can be considered that a random access request initiated by the UE fails, and the subsequent PDCCH indicating the RAR message may not be detected.

In an embodiment, each timing pilot signal corresponds to a different PDCCH, and each PDCCH indicates a different RAR message; or each timing pilot signal corresponds to a different PDCCH, and each PDCCH indicates a same RAR message; or each timing pilot signal corresponds to a same PDCCH, and each PDCCH indicates a same RAR message.

Figure 3:
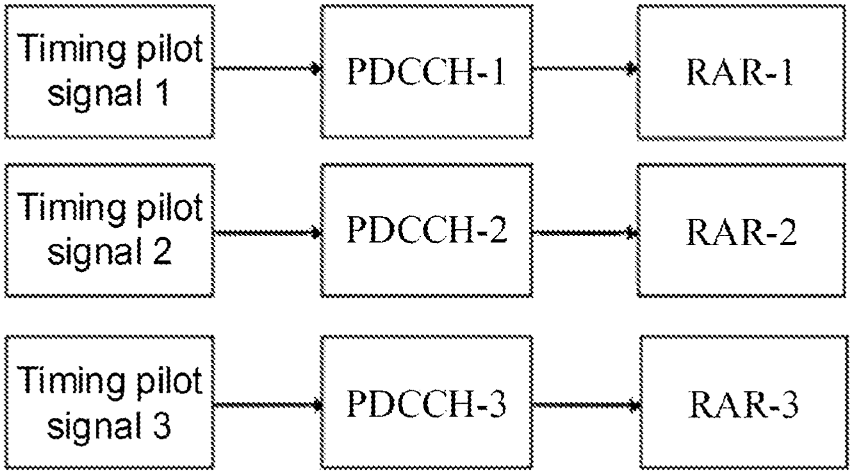
FIG. 3 is a schematic diagram illustrating a corresponding relationship between a timing pilot signal, a PDCCH and a RAR, in accordance with an embodiment.

FIG. 3 is a schematic diagram illustrating a corresponding relationship between a timing pilot signal, a PDCCH and a RAR, in accordance with an embodiment. As shown in FIG. 3, each timing pilot signal corresponds to a PDCCH indicating a RAR message, different timing pilot signals correspond to different PDCCHs, and each PDCCH indicates a different RAR message.

Figure 4:
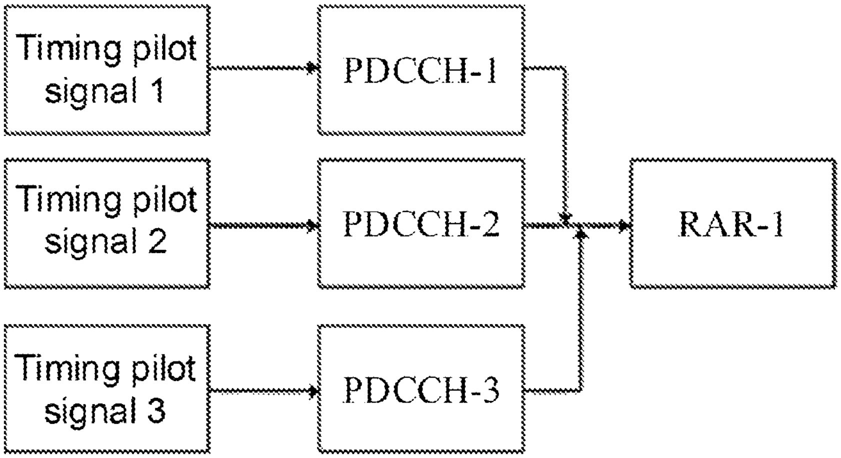
FIG. 4 is a schematic diagram illustrating a corresponding relationship between a timing pilot signal, a PDCCH and a RAR, in accordance with another embodiment.

FIG. 4 is a schematic diagram illustrating a corresponding relationship between a timing pilot signal, a PDCCH and a RAR, in accordance with another embodiment. As shown in FIG. 4, each timing pilot signal corresponds to a PDCCH indicating a RAR message, different timing pilot signals correspond to different PDCCHs, and each PDCCH indicates a same RAR message.

Figure 5:
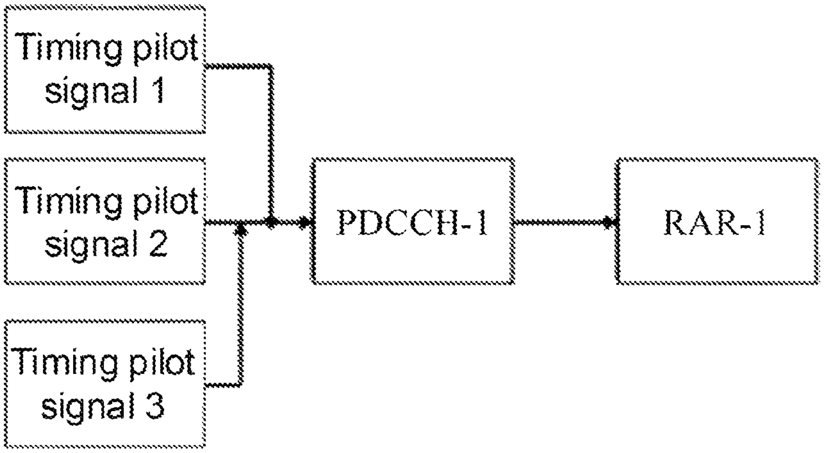
FIG. 5 is a schematic diagram illustrating a corresponding relationship between a timing pilot signal, a PDCCH and a RAR, in accordance with yet another embodiment.

FIG. 5 is a schematic diagram illustrating a corresponding relationship between a timing pilot signal, a PDCCH and a RAR, in accordance with yet another embodiment. As shown in FIG. 5, each timing pilot corresponds to a PDCCH indicating a RAR message, different timing pilot signals correspond to a same PDCCH, and each PDCCH indicates a same RAR message.

In an embodiment, step 120 includes:

detecting, in a case of receiving the timing pilot signal within a preset time window, the RAR message and the PDCCH.

The method further includes:

step 140: not detecting, in a case of not receiving the timing pilot signal within the preset time window, the RAR message and the PDCCH.

In this embodiment, the AP transmits the timing pilot signal responding to the PRACH within the preset time window. If the UE does not detect the timing pilot signal within the preset time window, it is considered that the random access request fails, and a subsequent RAR and a PDCCH indicating the RAR message may not be detected, thereby reducing the complexity of the UE detecting the PDCCH, also accelerating the re-initiation of random access by the UE, and improving the access efficiency.

In an embodiment, the timing pilot signal is at least one in number; and each timing pilot signal occupies K control channel elements (CCEs), where K is an integer greater than 1.

In this embodiment, after receiving the PRACH transmitted by the UE, the network side can transmit one or more timing pilot signals responding to the PRACH. The timing pilot signal (or signals) are transmitted in a common search space configured by the network. Each timing pilot signal occupies K ($K>1$) CCEs.

In an embodiment, K is an element in an aggregation level set of the PDCCH; or K is determined according to an aggregation level of the PDCCH.

In this embodiment, there are two methods for determining a value of the K as follows.

Method 1: K is a preset constant, and the aggregation level set of the PDCCH indicating the RAR message is denoted as S, for example, $S=\{1, 2, 4, 8, 16, 32\}$, and K is an element in the set S, for example, K is equal to 1 ($K=1$).

Method 2: K is determined by the aggregation level of the PDCCH indicating the RAR message, for example, in a case where the aggregation level (denoted as A) of the PDCCH indicating the RAR message is 1, 2, 4 or 8, K is 1, 2, 4 or 8 accordingly, or $$K = \left\lceil \frac{A}{P} \right\rceil,$$

where P is a preset integer greater than 1.

In an embodiment, the CCEs occupied by each timing pilot signal and CCEs occupied by a corresponding PDCCH belong to a same CCE candidate set; and position indexes of the CCEs occupied by each timing pilot signal in the CCE candidate set are same as or different from position indexes of the CCEs occupied by the corresponding PDCCH in the CCE candidate set.

In this embodiment, the CCEs occupied by each timing pilot signal and the CCEs occupied by the corresponding PDCCH belong to the same CCE candidate set. Assuming that the aggregation level of the PDCCH is A (A may be a value selected from 1, 2, 4, 8, 16 and 32), in order to improve flexibility of a system and reduce blocking probability of the PDCCH, the PDCCH may be transmitted at multiple candidate positions, where each position includes A CCEs. Assuming that the number of candidate positions is Q, and different positions are respectively represented by indexes 1, 2, 3, . . . , Q, a position at which the timing pilot signal is transmitted is also one of the Q positions.

In some embodiments, a position at which the timing pilot signal is transmitted and a position at which the PDCCH is transmitted belong to a same set, but may correspond to different position indexes. In this case, the timing pilot signal and the PDCCH may be transmitted in different time slots, or in a same time slot. Alternatively, a position at which the timing pilot signal is transmitted and a position at which the PDCCH is transmitted not only belong to a same set, but also correspond to a same position index, in which case the timing pilot signal and the PDCCH are transmitted in different time slots.

In an embodiment, the method further includes:

step 100: receiving a system message, the system message including at least one of: a relationship between the index of the PRACH and the timing pilot signal; or a relationship between the RA-RNTI of the PRACH and the timing pilot signal.

In this embodiment, there may be a one-to-one or one-to-many relationship between the index and/or RA-RNTI of the PRACH and the timing pilot signal; and the network side may inform a UE of the relationship between the index and/or RA-RNTI of the PRACH and the timing pilot signal in the system message such as SIB-1.

In embodiments of the present application, an access control method is provided. An AP that receives a PRACH can serve as a candidate access point for a UE to access a network, and transmits a timing pilot signal, a RAR message and a PDCCH indicating the RAR message to the UE, which extends access points that can be selected by the UE, and enables the terminal to obtain a high quality of service. For technical details that are not described in detail in these embodiments, reference may be made to any of the above embodiments.

Figure 6:
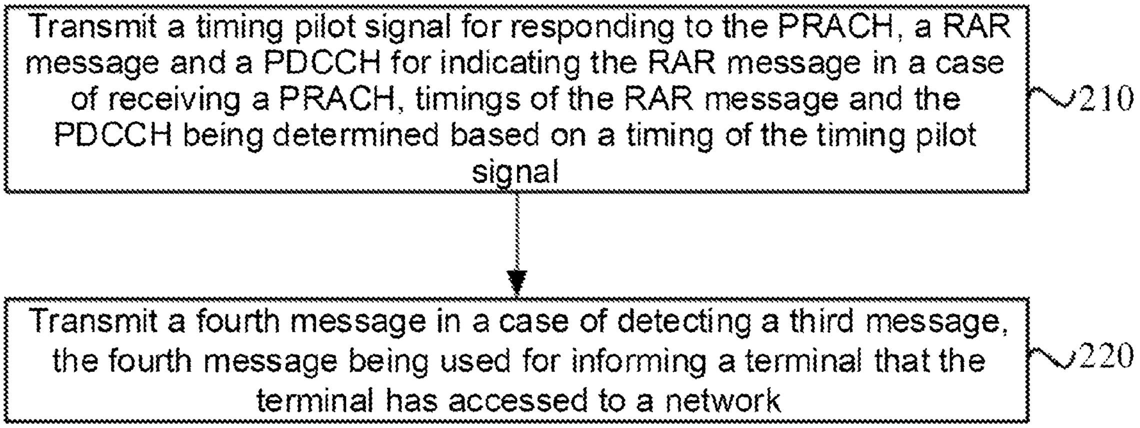
FIG. 6 is a flow chart of an access control method, in accordance with an embodiment.

FIG. 6 is a flow chart of an access control method, in accordance with an embodiment. As shown in FIG. 6, the method provided by this embodiment includes step 210 and step 220.

In step 210, in a case of receiving a PRACH, a timing pilot signal for responding to the PRACH, a RAR message and a PDCCH for indicating the RAR message are transmitted, timings of the RAR message and the PDCCH being determined based on a timing of the timing pilot signal. For example, the timing pilot signal, the RAR message and the PDCCH have same timing information.

In step 220, in a case of detecting a third message, a fourth message is transmitted, the fourth message being used for informing a terminal that the terminal has accessed to a network.

In this embodiment, the UE transmits the PRACH, and there may be one or more APs on a network side receiving the PRACH transmitted by the UE. After receiving the PRACH, each AP can transmit a timing pilot signal responding to the PRACH to the UE. A timing of the timing pilot signal may be same as or different from a timing of the SSB or SIB-1. After transmitting the timing pilot signal, each AP further transmits a RAR message and a PDCCH indicating the RAR message, and timings of the RAR message and the PDCCH are related to the timing of the timing pilot signal transmitted. After receiving the timing pilot signal, the UE transmits Msg3 to the AP transmitting the timing pilot signal, thereby making a request to the AP access to the network. After the AP detects Msg3, it transmits Msg4 to the UE to inform the UE that the UE has accessed to the network.

In an embodiment, step 210 includes:

transmitting the timing pilot signal, the RAR message and the PDCCH according to an instruction of a control node or according to a negotiation result of an AP responding to the PRACH.

In this embodiment, the AP transmitting the timing pilot signal, the RAR message and the PDCCH may be determined according to strength of a received PRACH signal, timing information, AP load and/or available resources. The AP may be determined by APs receiving the PRACH signal by negotiating with each other, or determined by a central control node according to information reported by the APs receiving the PRACH signal. The RAR message and the PDCCH follow the timing of the timing pilot signal.

In an embodiment, the timing pilot signal satisfies at least one of: that an index of the PRACH satisfies a one-to-one relationship with the timing pilot signal; or that a RA-RNTI of the PRACH satisfies a one-to-one relationship with the timing pilot signal.

In an embodiment, the third message includes an index of an optimal timing pilot signal (hereinafter referred to as optimal pilot index) obtained by measurement; and the timing pilot signal satisfies at least one of: that an index of the PRACH satisfies a one-to-many relationship with the timing pilot signal; or that a RA-RNTI of the PRACH satisfies a one-to-many relationship with the timing pilot signal.

In an embodiment, each timing pilot signal corresponds to a different PDCCH, and each PDCCH indicates a different RAR message; or each timing pilot signal corresponds to a different PDCCH, and each PDCCH indicates a same RAR message; or each timing pilot signal corresponds to a same PDCCH, and each PDCCH indicates a same RAR message.

In an embodiment, the method further includes:

step 230: updating, according to the optimal pilot index, precoding information and timing information of each timing pilot signal, and a set of APs transmitting the timing pilot signal.

In this embodiment, in a case where a one-to-many relationship is satisfied between the index and/or RA-RNTI of the PRACH and the timing pilot signal, precoding used by each timing pilot signal may be different, the set of APs transmitting each timing pilot signal may be different, and the timing information of each timing pilot signal may be different. The AP can update the precoding information and the timing information of each timing pilot signal and the set of APs transmitting the timing pilot signal, according to the optimal pilot index reported in the Msg3, i.e., the AP3 in the above embodiments, so as to further optimize the AP3 to enable the UE to obtain a good quality of service and achieve a high spectrum efficiency after random access is successful.

In an embodiment, transmitting the timing pilot signal for responding to the PRACH, includes:

determining the timing pilot signal for responding to the PRACH according to the PRACH, and transmitting the timing pilot signal for responding to the PRACH within a preset time window.

In an embodiment, the timing pilot signal is at least one in number; and each pilot signal occupies K CCEs, where K is an integer greater than 1.

In an embodiment, K is an element in an aggregation level set of the PDCCH; or K is determined according to an aggregation level of the PDCCH.

In an embodiment, the CCEs occupied by each timing pilot signal and CCEs occupied by a corresponding PDCCH belong to a same CCE candidate set; and position indexes of the CCEs occupied by each timing pilot signal in the CCE candidate set are same as or different from position indexes of the CCEs occupied by the corresponding PDCCH in the CCE candidate set.

In an embodiment, the method further includes:

step 200: transmitting a system message, the system message including at least one of: a relationship between an index of the PRACH and the timing pilot signal; or a relationship between a RA-RNTI of the PRACH and the timing pilot signal.

Figure 7:
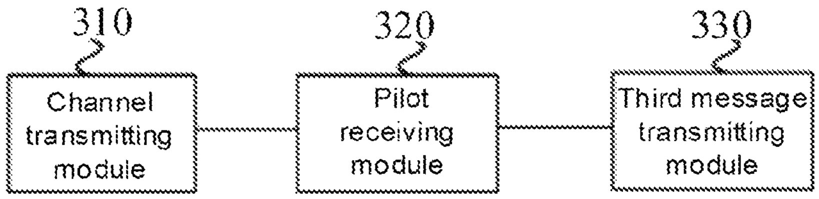
FIG. 7 is a schematic structural diagram of a random access apparatus, in accordance with an embodiment.

Embodiments of the present application provide a random access apparatus. FIG. 7 is a schematic structural diagram of a random access apparatus, in accordance with an embodiment. As shown in FIG. 7, the random access apparatus includes a channel transmitting module 310, a pilot receiving module 320 and a third message transmitting module 330.

The channel transmitting module 310 is configured to transmit a PRACH. The pilot receiving module 320 is configured to receive a timing pilot signal for responding to the PRACH, and detect a RAR message and a PDCCH for indicating the RAR message, where timings of the RAR message and the PDCCH are determined based on a timing of the timing pilot signal. The third message transmitting module 330 is configured to transmit a third message according to the timing pilot signal, the RAR message and the PDCCH, where the third message is used for requesting to access the network.

The random access apparatus in this embodiment selects an AP to be accessed among APs capable of responding to the PRACH by receiving the timing pilot signal, thereby extending selectable access points and enabling the terminal to obtain a high quality of service.

In an embodiment, the timing pilot signal satisfies at least one of: that an index of the PRACH satisfies a one-to-one relationship with the timing pilot signal; or a RA-RNTI of the PRACH satisfies a one-to-one relationship with the timing pilot signal.

In an embodiment, the third message includes an index of an optimal timing pilot signal obtained by measurement; and the timing pilot signal satisfies at least one of: that an index of the PRACH satisfies a one-to-many relationship with the timing pilot signal; or that a RA-RNTI of the PRACH satisfies a one-to-many relationship with the timing pilot signal.

In an embodiment, each timing pilot signal corresponds to a different PDCCH, and each PDCCH indicates a different RAR message; or each timing pilot signal corresponds to a different PDCCH, and each PDCCH indicates a same RAR message; or each timing pilot signal corresponds to a same PDCCH, and each PDCCH indicates a same RAR message.

In an embodiment, the pilot receiving module 320 is configured to detect the RAR message and the PDCCH in a case of receiving the timing pilot signal within a preset time window; and the pilot receiving module 320 is further configured to not detect the RAR message and the PDCCH in a case of not receiving the timing pilot signal within the preset time window.

In an embodiment, the timing pilot signal is at least one in number; and each timing pilot signal occupies K CCEs, where K is an integer greater than 1.

In an embodiment, K is an element in an aggregation level set of the PDCCH; or K is determined according to an aggregation level of the PDCCH.

In an embodiment, the CCEs occupied by each timing pilot signal and CCEs occupied by a corresponding PDCCH belong to a same CCE candidate set; and position indexes of the CCEs occupied by each timing pilot signal in the CCE candidate set are same as or different from position indexes of the CCEs occupied by the corresponding PDCCH in the CCE candidate set.

In an embodiment, the random access apparatus further includes: a system message receiving module configured to receive a system message; and the system message includes at least one of: a relationship between the index of the PRACH and the timing pilot signal; or a relationship between the RA-RNTI of the PRACH and the timing pilot signal.

The random access apparatus provided in this embodiment belongs to a same conception as the random access method provided in the above embodiments. For technical details that are not described in detail in this embodiment, reference may be made to any of the above embodiments, and this embodiment has same effect as performing the random access method.

Figure 8:
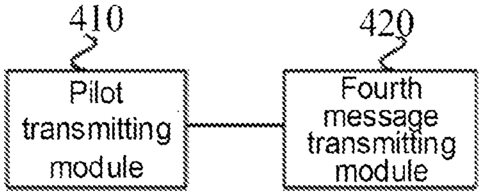
FIG. 8 is a schematic structural diagram of an access control apparatus, in accordance with an embodiment.

Embodiments of the present application provide an access control apparatus. FIG. 8 is a schematic structural diagram of an access control apparatus, in accordance with an embodiment. As shown in FIG. 8, the access control apparatus includes a pilot transmitting module 410 and a fourth message transmitting module 420.

The pilot transmitting module 410 is configured to transmit a timing pilot signal for responding to a PRACH, a RAR message and a PDCCH for indicating the RAR message in a case of receiving a PRACH, where timings of the RAR message and the PDCCH are determined based on a timing of the timing pilot signal. The fourth message transmitting module 420 is configured to transmit a fourth message in a case of detecting a third message, where the fourth message us used for informing a terminal that the terminal has accessed to a network.

The access control apparatus in this embodiment transmits the timing pilot signal, the RAR message and the PDCCH indicating the RAR message to a UE, which extends access points that can be selected by the UE, and enables the terminal to obtain a high quality of service.

In an embodiment, the pilot transmitting module 410 is configured to transmit the timing pilot signal, the RAR message and the PDCCH according to an instruction of a control node or according to a negotiation result of an AP responding to the PRACH.

In an embodiment, the timing pilot signal satisfies at least one of: that an index of the PRACH satisfies a one-to-one relationship with the timing pilot signal; or that a RA-RNTI of the PRACH satisfies a one-to-one relationship with the timing pilot signal.

In an embodiment, the third message includes an index of an optimal timing pilot signal (hereinafter referred to as optimal pilot index) obtained by measurement; and the timing pilot signal satisfies at least one of: that an index of the PRACH satisfies a one-to-many relationship with the timing pilot signal; or that a RA-RNTI of the PRACH satisfies a one-to-many relationship with the timing pilot signal.

In an embodiment, each timing pilot signal corresponds to a different PDCCH, and each PDCCH indicates a different RAR message; or each timing pilot signal corresponds to a different PDCCH, and each PDCCH indicates a same RAR message; or each timing pilot signal corresponds to a same PDCCH, and each PDCCH indicates a same RAR message.

In an embodiment, the access control apparatus further includes: an update module configured to update, according to the optimal pilot index, precoding information and timing information of each timing pilot signal and a set of APs transmitting the timing pilot signal.

In an embodiment, the pilot transmitting module 410 includes: a pilot signal transmitting unit configured to determine a timing pilot signal for responding to the PRACH according to the PRACH, and transmit the timing pilot signal for responding to the PRACH within a preset time window.

In an embodiment, the timing pilot signal is at least one in number; and each pilot signal occupies K CCEs, where K is an integer greater than 1.

In an embodiment, K is an element in an aggregation level set of the PDCCH; or K is determined according to an aggregation level of the PDCCH.

In an embodiment, the CCEs occupied by each timing pilot signal and the CCEs occupied by a corresponding PDCCH belong to a same CCE candidate set; and position indexes of the CCEs occupied by each timing pilot signal in the CCE candidate set are same as or different from position indexes of the CCEs occupied by the corresponding PDCCH in the CCE candidate set.

In an embodiment, the access control apparatus further includes: a system message transmitting module configured to transmit a system message; and the system message including at least one of: that a relationship between an index of the PRACH and the timing pilot signal; or that a relationship between a RA-RNTI of the PRACH and the timing pilot signal.

The access control apparatus provided in this embodiment belongs to a same conception as the access control method provided in the above embodiments. For technical details not described in detail in this embodiment, reference may be made to any of the above embodiments, and this embodiment has same effect as performing the access control method.

Figure 9:
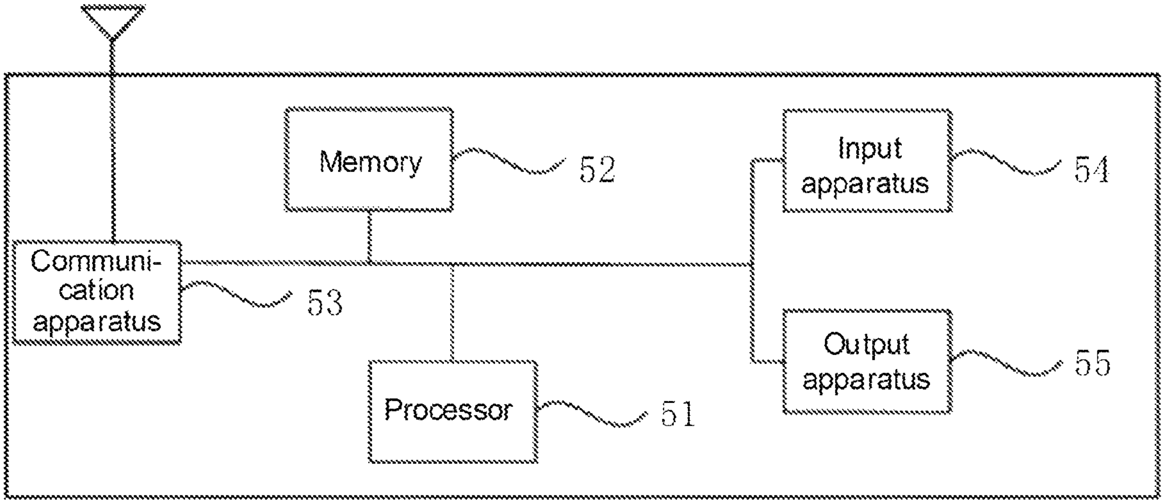
FIG. 9 is a schematic structural diagram of hardware of a terminal, in accordance with an embodiment.

Embodiments of the present application provide a terminal. FIG. 9 is a schematic structural diagram of hardware of a terminal, in accordance with an embodiment. As shown in FIG. 9, the terminal provided in the present application includes a memory 52, a processor 51, and a computer program stored on the memory and executable on the processor, and the processor 51 implements the above random access method when executing the program.

There may be one or more processors 51 in the terminal, and one processor 51 is taken as an example in FIG. 9. The memory 52 is used for storing one or more programs, and the one or more programs are executed by the one or more processors 51, so that the one or more processors 51 implement the random access method described in the embodiments of the present application.

The terminal further includes: a communication apparatus 53, an input apparatus 54 and an output apparatus 55.

The processor 51, the memory 52, the communication apparatus 53, the input apparatus 54 and the output apparatus 55 that are in the terminal may be connected via a bus or in other manners, and connection via a bus is taken as an example in FIG. 9.

The input apparatus 54 can be used for receiving input numeric or character information, and generate key signal input related to user settings and function control of the terminal. The output apparatus 55 may include a display device such as a display screen.

The communication apparatus 53 may include a receiver and a transmitter. The communication apparatus 53 is configured to perform information transceiving communication according to the control of the processor 51.

The memory 52, as a computer-readable storage medium, can be configured to store software programs, computer-executable programs and modules, such as program instructions/modules corresponding to the random access method described in the embodiments of the present application (e.g., the channel transmitting module 310, the pilot receiving module 320 and the third message transmitting module 330 in the random access apparatus). The memory 52 may include a program storage area and a data storage area, where the program storage area can store an operating system and an application program required for at least one function, and the storage data area can store data created according to the use of the terminal, etc. In addition, the memory 52 may include high speed random access memory and may also include non-volatile memory, such as at least one magnetic disk storage device, flash memory device, or other non-volatile solid state storage device. In some examples, the memory 52 may further include a memory that is remotely provided relative to the processor 51, and this remote memory may be connected to the terminal via a network. Examples of the above network include, but are not limited to, the Internet, the intranet, the local area network, the mobile communication network, and combinations thereof.

Figure 10:
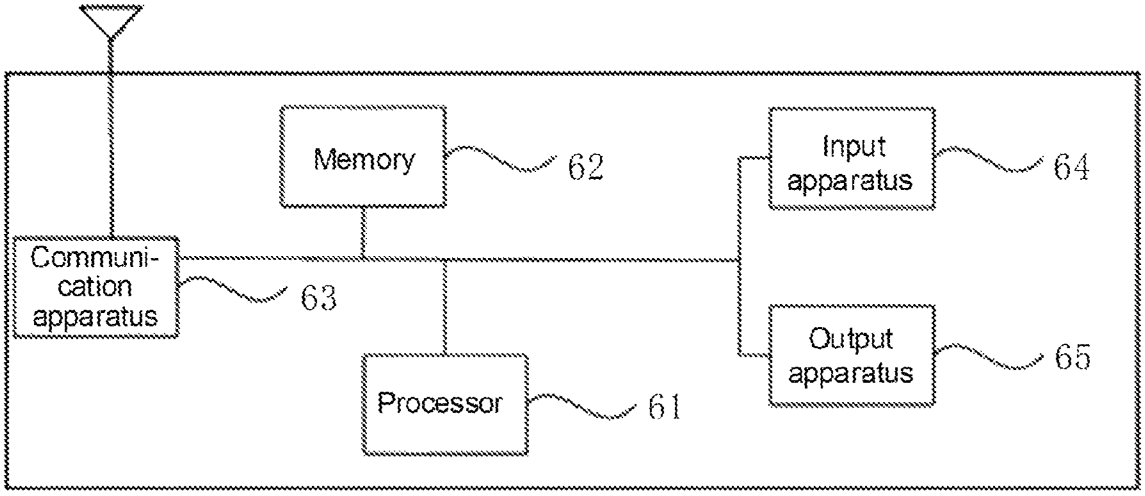
FIG. 10 is a schematic structural diagram of hardware of an access point, in accordance with an embodiment.

Embodiments of the present application provide an access point. FIG. 10 is a schematic structural diagram of hardware of an access point, in accordance with an embodiment. As shown in FIG. 10, the access point provided in the present application includes a memory 62, a processor 61 and a computer program stored on the memory and executable on the processor, and the processor 61, when executing the program, implements the above access control method.

There may be one or more processors 61 in the access point, and one processor 61 is taken as an example in FIG. 10; the memory 62 is used for storing one or more programs; the one or more programs are executed by the one or more processors 61, so that the one or more processors 61 implement the access control method described in the embodiments of the present application.

The access point further includes a communication apparatus 63, an input apparatus 64 and an output apparatus 65.

The processor 61, the memory 62, the communication apparatus 63, the input apparatus 64 and the output apparatus 65 that are in the access point may be connected via a bus or in other manners, and connection via a bus is taken as an example in FIG. 10.

The input apparatus 64 can be used for receiving input numeric or character information, and generate key signal input related to user settings and function control of the access point. The output apparatus 65 may include a display device such as a display screen.

The communication apparatus 63 may include a receiver and a transmitter. The communication apparatus 63 is configured to perform information transceiving communication according to the control of the processor 61.

The memory 62, as a computer-readable storage medium, can be configured to store software programs, computer-executable programs and modules, such as program instructions/modules corresponding to the access control method described in the embodiments of the present application (e.g., the pilot transmitting module 410 and the fourth message transmitting module 420 in the access control apparatus). The memory 62 may include a program storage area and a data storage area, where the program storage area can store an operating system and an application program required for at least one function, and the storage data area can store data created according to the use of the access point, etc. In addition, the memory 62 may include high speed random access memory and may also include non-volatile memory, such as at least one magnetic disk storage device, flash memory device, or other non-volatile solid state storage device. In some examples, the memory 62 may further include a memory that is remotely provided relative to the processor 61, and this remote memory may be connected to the access point via a network. Examples of the above network include, but are not limited to, the Internet, the intranet, the local area network, the mobile communication network, and combinations thereof.

Embodiments of the present application provide a storage medium having stored a computer program that, when executed by a processor, implements the random access method or the access control method described in any of the embodiments of the present application.

The random access method includes: transmitting a PRACH; receiving a timing pilot signal for responding to the PRACH and detecting a RAR message and a PDCCH for indicating the RAR message, timings of the RAR message and the PDCCH being determined based on a timing of the timing pilot signal; and transmitting a third message according to the timing pilot signal, the RAR message and the PDCCH, the third message being used for requesting access to a network.

The access control method includes: transmitting, in a case of receiving a PRACH, a timing pilot signal for responding to the PRACH, a RAR message and a PDCCH for indicating the RAR message, timings of the RAR message and the PDCCH being determined based on a timing of the timing pilot signal; and transmitting, in a case of detecting a third message, a fourth message, the fourth message being used for informing a terminal that the terminal has accessed to a network.

The computer storage medium in the embodiments of the present application may take any combination of one or more computer-readable media. The computer-readable medium may be a computer-readable signal medium or a computer-readable storage medium. The computer-readable storage medium may be, for example, but not limited to: an electrical, magnetic, optical, electromagnetic, infrared or semiconductor system, apparatus or device, or any combination of the above. Examples (a non-exhaustive list) of computer-readable storage media include: an electrical connection having one or more wires, a portable computer disk, a hard disk, a random access memory (RAM), a read only memory (ROM), an erasable programmable read only memory (EPROM), a flash memory, an optical fiber, a portable CD-ROM, an optical storage device, a magnetic storage device, or any suitable combination of the above. The computer-readable storage medium may be any tangible medium that includes or stores a program for use by or in connection with an instruction execution system, apparatus, or device.

The computer-readable signal medium may include data signals propagated in a baseband or as part of a carrier wave, where the data signals carry computer-readable program code. Such propagated data signals may take many forms, including but not limited to: electromagnetic signals, optical signals, or any suitable combination of the above. The computer-readable signal medium may also be any computer-readable medium other than a computer-readable storage medium, which can send, propagate or transmit a program for use by or in conjunction with an instruction execution system, apparatus or device.

Program code included in the computer-readable medium may be transmitted using any appropriate medium, including but not limited to: wireless, wire, optical cable, radio frequency (RF), or any suitable combination of the above.

Computer program code for performing operations of the present application may be written in one or more programming languages or combinations thereof, including object-oriented programming languages such as Java, Smalltalk, C++, and a conventional procedural programming language, such as a "C" language or similar programming language. The program code may execute entirely on the user's computer, partly on the user's computer, as a stand-alone software package, partly on the user's computer and partly on a remote computer, or entirely on the remote computer or server. In a case of involving a remote computer, the remote computer may be connected to the user's computer through any kind of network, including a local area network (LAN) or a wide area network (WAN), or may be connected to an external computer (e.g., connected through the Internet using an Internet Service Provider).

The above descriptions are merely exemplary embodiments of the present application.

It will be understood by those skilled in the art that a term "user/terminal" covers any suitable type of wireless user equipment, such as a mobile phone, a portable data processing apparatus, a portable web browser or a vehicle-mounted mobile station.

In general, various embodiments of the present application may be implemented in hardware or special purpose circuits, software, logic, or any combination thereof. For example, some aspects may be implemented in hardware, while other aspects may be implemented in firmware or software, which may be executed by a controller, microprocessor or any other computing apparatus, although the present application is not limited thereto.

The embodiments of the present application may be implemented by a data processor of a mobile apparatus executing computer program instructions, for example, in a processor entity, or by hardware, or by a combination of software and hardware. The computer program instructions may be assembly instructions, instruction set architecture (ISA) instructions, machine instructions, machine-dependent instructions, microcode, firmware instructions, state setting data, or source or object code written in any combination of one or more programming languages.

Block diagrams of any logic flow in the drawings of the present application may represent program steps, or may represent interconnected logic circuits, modules and functions, or may represent a combination of program steps and logic circuits, modules and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (a digital video disc (DVD) or a compact disk (CD), etc.). The computer-readable medium may include a non-transitory storage medium. The data processor may be of any type suitable for the local technical environment, such as, but not limited to, a general purpose computer, a special purpose computer, a microprocessor, a digital signal processor (DSP), an application specific integrated circuit (ASIC), a field-programmable gate array (FPGA), and a processor based on a multi-core processor architecture.

What is claimed is:

1. A random access method applied to a terminal, the method comprising:

transmitting a physical random access channel (PRACH);

receiving a timing pilot signal for responding to the PRACH from an access point on a network side and detecting a random access response (RAR) message and a physical downlink control channel (PDCCH) for indicating the RAR message, timings of the RAR message and the PDCCH being determined based on a timing of the timing pilot signal; and transmitting a third message according to the timing pilot signal, the RAR message and the PDCCH, the third message being used for requesting access to a network; wherein receiving the timing pilot signal for responding to the PRACH and detecting the RAR message and the PDCCH for indicating the RAR message, includes:

detecting, in a case of receiving the timing pilot signal within a preset time window, the RAR message and the PDCCH; and the method further comprises:

not detecting, in a case of not receiving the timing pilot signal within the preset time window, the RAR message and the PDCCH;

the timing pilot signal is at least one in number; and each timing pilot signal occupies K control channel elements (CCEs), K being an integer greater than 1; and the CCEs occupied by each timing pilot signal and CCEs occupied by a PDCCH corresponding to each timing pilot signal belong to a same CCE candidate set.

2. The method according to claim 1, wherein the timing pilot signal satisfies at least one of:

that an index of the PRACH satisfies a one-to-one relationship with the timing pilot signal; or that a random access-radio network temporary identity (RA-RNTI) of the PRACH satisfies a one-to-one relationship with the timing pilot signal.

3. The method according to claim 1, wherein the third message includes an index of an optimal timing pilot signal obtained by measurement; and the timing pilot signal satisfies at least one of:

that an index of the PRACH satisfies a one-to-many relationship with the timing pilot signal; or that a random access-radio network temporary identity (RA-RNTI) of the PRACH satisfies a one-to-many relationship with the timing pilot signal.

4. The method according to claim 3, wherein

PDCCHs corresponding to different timing pilot signals are different, and RAR messages indicated by different PDCCHs are different; or PDCCHs corresponding to different timing pilot signals are different, and RAR messages indicated by different PDCCHs are same; or PDCCHs corresponding to different timing pilot signals are the same, and RAR messages indicated by different PDCCHs are same.

5. The method according to claim 1, wherein K is an element in an aggregation level set of the PDCCH; or K is determined according to an aggregation level of the PDCCH; or position indexes of the CCEs occupied by each timing pilot signal in the CCE candidate set are same as or different from position indexes of the CCEs occupied by the PDCCH corresponding to each timing pilot signal in the CCE candidate set.

6. The method according to claim 1, further comprising: receiving a system message, the system message including at least one of:

a relationship between an index of the PRACH and the timing pilot signal; or a relationship between a random access-radio network temporary identity (RA-RNTI) of the PRACH and the timing pilot signal.

7. An access control method applied to an access point on a network side, the method comprising:

transmitting, in a case of receiving a physical random access channel (PRACH), a timing pilot signal for responding to the PRACH, a random access response (RAR) message and a physical downlink control channel (PDCCH) for indicating the RAR message to a terminal, timings of the RAR message and the PDCCH being determined based on a timing of the timing pilot signal; and transmitting, in a case of detecting a third message, a fourth message, the fourth message being used for informing a terminal that the terminal has accessed to a network; wherein transmitting the timing pilot signal for responding to the PRACH, includes:

determining the timing pilot signal for responding to the PRACH according to the PRACH, and transmitting the timing pilot signal for responding to the PRACH within a preset time window;

the timing pilot signal is at least one in number; and each pilot signal occupies K control channel elements (CCEs), K being an integer greater than 1; and the CCEs occupied by each timing pilot signal and CCEs occupied by a PDCCH corresponding to each timing pilot signal belong to a same CCE candidate set.

8. The method according to claim 7, wherein transmitting the timing pilot signal for responding to the PRACH, the RAR message and the PDCCH for indicating the RAR message, includes:

transmitting the timing pilot signal, the RAR message and the PDCCH according to an instruction of a control node or according to a negotiation result of an access point responding to the PRACH; or the timing pilot signal satisfies at least one of:

that an index of the PRACH satisfies a one-to-one relationship with the timing pilot signal; or that a random access-radio network temporary identity (RA-RNTI) of the PRACH satisfies a one-to-one relationship with the timing pilot signal.

9. The method according to claim 7, wherein the third message includes an index of an optimal timing pilot signal obtained by measurement; and the timing pilot signal satisfies at least one of:

that an index of the PRACH satisfies a one-to-many relationship with the timing pilot signal; or that a random access-radio network temporary identity (RA-RNTI) of the PRACH satisfies a one-to-many relationship with the timing pilot signal.

10. The method according to claim 9, wherein

PDCCHs corresponding to different timing pilot signals are different, and RAR messages indicated by different PDCCHs are different; or PDCCHs corresponding to different timing pilot signals are different, and RAR messages indicated by different PDCCHs are same; or PDCCHs corresponding to different timing pilot signals are the same, and RAR messages indicated by different PDCCHs the same.

11. The method according to claim 9, wherein the timing pilot signal is at least one in number;

the method further comprises:

updating, according to the index of the optimal timing pilot signal, precoding information and timing information of each timing pilot signal and a set of access points transmitting the timing pilot signal.

12. The method according to claim 7, wherein K is an element in an aggregation level set of the PDCCH; or K is determined according to an aggregation level of the PDCCH; or position indexes of the CCEs occupied by each timing pilot signal in the CCE candidate set are same as or different from position indexes of the CCEs occupied by the PDCCH corresponding to each timing pilot signal in the CCE candidate set.

13. The method according to claim 7, further comprising: transmitting a system message, the system message including at least one of:

a relationship between an index of the PRACH and the timing pilot signal; or a relationship between a random access-radio network temporary identity (RA-RNTI) of the PRACH and the timing pilot signal.

14. A terminal, comprising a memory, a processor, and a computer program stored on the memory and executable on the processor, wherein the processor, when executing the program, implements the random access method according to claim 1.

15. An access point, comprising a memory, a processor, and a computer program stored on the memory and executable on the processor, wherein the processor, when executing the program, implements the access control method according to claim 7.

16. A non-transitory computer-readable storage medium having stored a computer program, wherein the program, when executed by a processor, implements the random access method according to claim 1.

17. A non-transitory computer-readable storage medium having stored a computer program, wherein the program, when executed by a processor, implements the access control method according to claim 7.

* * * * *